D. P. BLACKSTONE.
Water-Wheels.
No. 148,869.             Patented March 24, 1874.
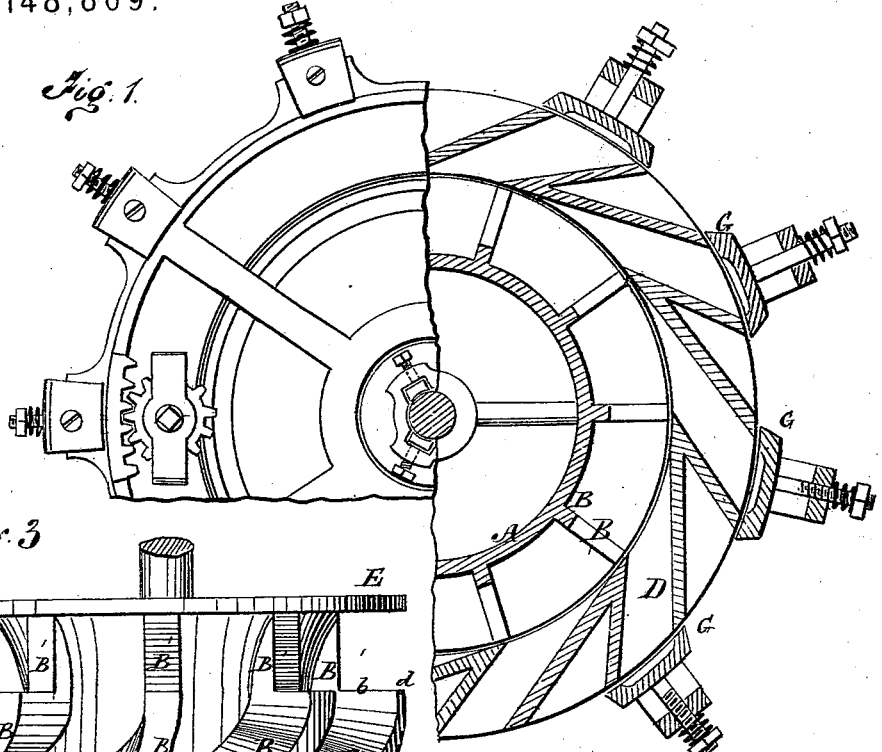
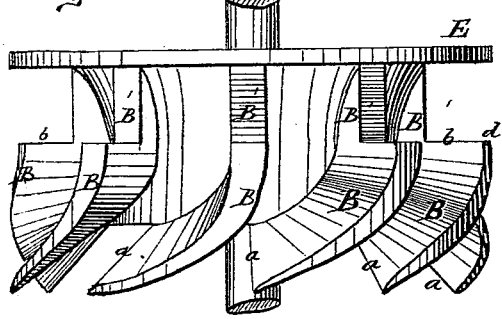
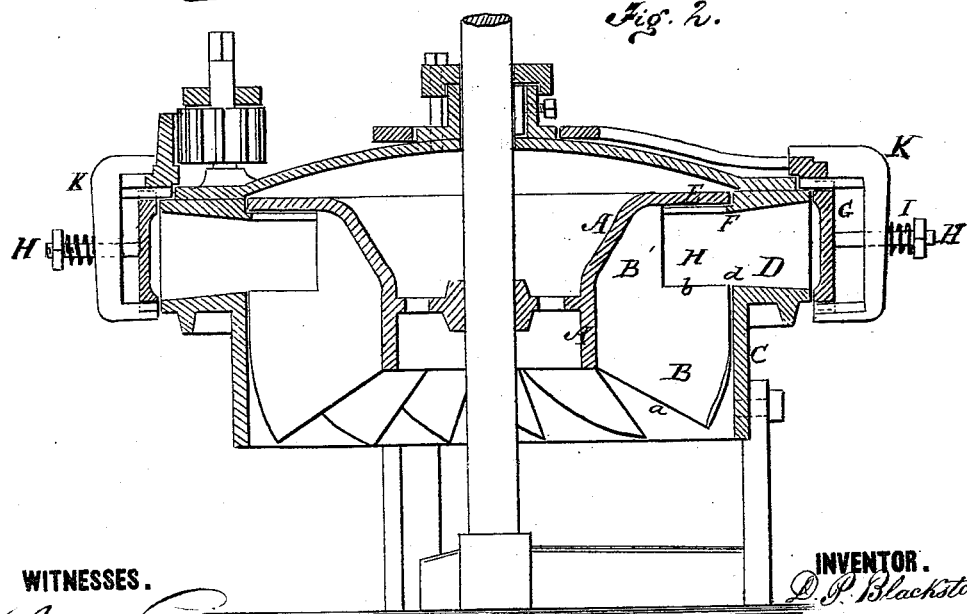
WITNESSES.
INVENTOR.
D. P. Blackstone
BY
ATTORNEYS.

UNITED STATES PATENT OFFICE.

DODGE P. BLACKSTONE, OF BERLIN, WISCONSIN.

IMPROVEMENT IN WATER-WHEELS.

Specification forming part of Letters Patent No. 148,869, dated March 24, 1874; application filed January 10, 1874.

*To all whom it may concern:*

Be it known that I, DODGE P. BLACKSTONE, of Berlin, in the county of Green Lake and State of Wisconsin, have invented a new and Improved Water-Wheel, of which the following is a specification:

My invention relates to improvements in turbines; and consists, first, in forming a flume or free annular passage around the wheel, between its hub and the inclosing stationary part in which the chutes are located; second, in the arrangement of the gates for closing the chutes.

Figure 1 is partly a plan view and partly a horizontal section of my improved wheel, and Fig. 2 is a transverse sectional elevation. Fig. 3 is a side elevation of the wheel.

Similar letters of reference indicate corresponding parts.

A represents the hub of the wheel; B, the buckets; C, the rim of the wheel-case below the chutes D. E represents the horizontal extension of the top of the wheel-hub, which projects into the groove F of the case. G represents the gates. The extension E of the top of the wheel-hub to the chutes is calculated to receive a lifting action of the water entering below it from the chutes, which will largely counteract the downward pressure of the water on the buckets, and the projection of the rim into the groove in the case prevents the water from rising up over the extension, so as to neutralize the said lifting action. The buckets are made to terminate at the upper end at the plane of the bottom of the chutes, except the narrow extensions B', for the more permanent connection of them to the hub, and thus leave a clear annular chamber, H, in front of the chutes, into which the water flows in a solid, unbroken volume, more even and regular, and in better condition for entering the buckets, than it could be if broken by the buckets running immediately in front of the chutes. The chutes are tangent to the rim of the wheel, or may vary from that to six degrees outward, and the buckets are arranged to discharge the water from twenty to thirty degrees downward from the horizontal plane.

The object in not always making the chutes on a tangent is to get more width of chutes when the buckets are dropped or the angles of discharge made greater, and thereby increase the quantity of water discharged. In case the water is received on a tangent, its momentum for its velocity of reception is transferred to the wheel. In case of its reception at an angle to a tangent, a component only is transferred to the wheel. That component is represented by the natural cosine of the angle, the whole force being unity.

It has been shown by experiment and test of water-chambered wheels, such as here represented, that the velocity of water in the chutes is to the velocity in the issues, inversely, as their size or capacity. This does not hold true of other wheels, without making a deduction for the thickness of buckets as far as they pass before the chutes, and also allowing something for the breakage of the water. Hence any law or rule applicable for comparative sizes of chutes and issues of other wheels does not apply to this wheel. Therefore, to get an equilibrium, and at the same time use up by the wheel the greatest amount of the forces of the water possible, and get its maximum effect, the sizes of the chutes should be to that of the issues inversely as to the natural cosine of the angle of a chute or the line of direction of the reception of the water with a tangent to the natural cosine of the angle made by a line in the direction of the discharge of water with a horizontal.

The bucket is constructed with a radial termination, $a$, and has dimensions between lines $a\ b$, decreasing from the rim of the wheel to the hub as radiuses of circles from rim to hub decrease. The base-line $b$ of the cycloid curve lies in the plane of the tops of the bucket. The curve is circumscribed by starting from the generating-point $d$ of the generating-circle at the top of the bucket, and for the bucket at the top of the rim of the wheel the axis of the cycloid at curve is three-quarters ($\frac{3}{4}$) of one-tenth ($\frac{1}{10}$) of the circumference of the wheel. The curve of the bucket is the curve of the quickest descent for a body acted on by gravity.

All causes of friction that retard the velocity of water in the chutes and buckets take from the power of water-wheels. The less of breakage or obstruction there is to the water the better, providing the water is properly applied to the wheel.

I have, therefore, endeavored to provide a bucket that gives little resistance to the flow of water, and has proportional dimensions from the rim of the wheel to the inner edge of the bucket, or to the hubs, as above stated.

The gates G, which close the mouths of the chutes, are hollowed out on the inner side, leaving only a bearing-surface around the edge. They are provided with stems H, which pass through slots in the brackets K of the gate-operating frame, and on these stems are placed spiral springs I, which bear against the brackets, and are adjusted to greater or less tension by nuts secured on the ends of the stems, as shown. The bracket-slots are so formed as to allow the gates considerable play on their seats or bearing-surface, and the springs take off the pressure of the head of water, so as to relieve the gates of much of the friction which would otherwise exist.

Having thus described my invention, I claim as new and desire to secure by Letters Patent—

The combination of the revolving wheel or hub A, provided with the buckets B, cut away in the upper part, and the stationary chutes D, terminating at their inner ends on a line concentric with said wheel, thus forming the open or free annular passage H, as shown and described.

DODGE P. BLACKSTONE.

Witnesses:
JAMES A. BIGGERT,
JAMES MACINSH.